United States Patent [19]

Knockeart et al.

[11] 3,860,794

[45] Jan. 14, 1975

[54] SYSTEM FOR CONVERTING MODULATED SIGNALS TO SQUAREWAVE OUTPUTS

[75] Inventors: Ronald P. Knockeart, Walled Lake; John R. Wilkinson, Dearborn, both of Mich.

[73] Assignee: Bendix Corporation

[22] Filed: Sept. 28, 1973

[21] Appl. No.: 401,930

Related U.S. Application Data

[63] Continuation of Ser. No. 207,214, Dec. 13, 1971.

[52] U.S. Cl. ........... 235/61.11 E, 307/261, 328/135

[51] Int. Cl. .......................... G06k 7/10, H03k 5/00

[58] Field of Search .... 235/61.11 E; 340/146.3 AG, 340/347 AD; 328/135, 28, 32, 34; 307/261, 268; 250/555, 566

[56] References Cited

UNITED STATES PATENTS

| | | | |
|---|---|---|---|
| 3,159,815 | 12/1964 | Groce | 340/146.3 AG |
| 3,223,972 | 12/1965 | Ulzurrun | 340/146.3 AG |
| 3,225,213 | 12/1965 | Hinrichs et al. | 328/135 |

*Primary Examiner*—Daryl W. Cook
*Attorney, Agent, or Firm*—Lester L. Hallacher

[57] ABSTRACT

An analog system for processing modulated reflected energy and producing a squarewave output representative of coded information causing the modulation is described. The modulation can be caused by reflecting energy from a segmented label coded by varying the widths of segments having different energy reflectives to define logic 1's and 0's. In such a usage, the inventive system produces a squarewave with maximum and minimum amplitudes determined by the segment reflectives and pulse widths proportional to the segment widths. The inventive system provides control of the pulse amplitudes and widths in the presence of noise. The inventive system also provides automatic gain control to compensate for variations in the output energy source, detector variations, power variations, and other internal system variations.

16 Claims, 11 Drawing Figures

SYSTEM FOR CONVERTING MODULATED SIGNALS TO SQUAREWAVE OUTPUTS

This is a continuation of application Ser. No. 207,214, filed Dec. 13, 1971.

BACKGROUND OF THE INVENTION

The environmental background in which the inventive concepts are employed can be best understood by referring to FIG. 1. FIG. 1 shows a container 11 bearing a label 12 which contains dark and light segments moving along a conveyor 13 in a direction indicated by arrow 14 so that the container passes through the line of sight of a scanning mechanism generally indicated as 16. Scanning mechanism 16 includes a multifaceted prism 17 which rotates about its central axis to cause the output energy of an energy source 18, such as a laser, to be transmitted to container 11 and reflected by the label 12 to another side of prism 17, where it is then received by a detector 19 such as a photomultiplying tube.

Label 12 has dark and light segments which have different energy reflectivities so that the reflected light beam is modulated in accordance with the segments present upon the label. Accordingly, any information coded onto label 12 by varying the widths of the segments modulates the reflected beam in accordance with the code. It is therefore possible to decode the information on the label by properly detecting and decoding the reflected energy.

Also included in the scanning mechanism is an energy detector such as a photocell 21 and a small sample label 22. Photocell 21 and label 22 are positioned so that they intercept the transmitted beam when the angular orientation of the beam is such that the beam falls upon container 11 but has not begun to scan label 12. When the transmitted beam is incident upon photodetector 21, automatic calibration circuitry is actuated to calibrate the energy reflected from sample label 22. This permits automatic calibration of the scanning system to accommodate for accumulations of dirt, other optical deficiencies, and other system parameter changes which arise with time.

The reflected energy from coded label 12 is directed from photomultiplying Tube 19 to an amplifying and detecting unit 23. The photomultiplier 19 and amplifier/detector 23 cooperate to convert the modulated energy waveform into a squarewave, the amplitudes and pulse widths of which are proportional to the modulation of the light beam and which, accordingly, are proportional to the segment widths present upon label 12.

Various types of systems presently exit for converting energy reflected from a coded label into a squarewave. However, these systems suffer various disadvantages, such as noise and background sensitivity. These disadvantages frequently arise from the manner of converting to a squarewave. An example is given with respect to FIGS. 2*a* and 2*b*. In FIG. 2*a* the dark current level from the PMT remains virtually unchanged if no reflected signal is received from a target. However, when a reflected signal is received it varies the PMT current in accordance with the reflectivity of the segments of the label. In FIG. 2*a* this is illustrated as a sinusoidal waveform. Conversion into a squarewave is achieved by utilizing the signal level above a threshold level as the high squarewave amplitude and the levels below the threshold as the low level amplitude.

This type of system is acceptable in closely controlled environments. However, in environments where ambient light levels vary, or the reflected signal is noisy, or the contrast between segments is poor the acceptability of the system decreases.

This can be understood by referring to FIG. 2*b*, where the threshold level does not fall near the center of the reflected signal because of ambient conditions. Hence, the squarewave output is distorted and is not truly representative of the reflected signal. Furthermore, the noise on the reflected signal can cause it to fall below the threshold level, further distorting the squarewave output.

FIG. 2*c* shows another deficiency of the prior art systems. In FIG. 2*c* the nominal PMT current (waveform 26) varies with scan angle because of the specular characteristics of reflected light. Hence, reflected signals 27 result in a uniform squarewave 28 because the threshold level is close to the midpoint of the reflected signal. However, reflected signals 29 occurring at another scan angle position result in a distorted squarewave 30 because the threshold level is near one excursion of the reflected signal. Furthermore, reflected signals 31 are above the threshold level and hence are not detected. Prior art systems usually employ sophisticated filtering in an attempt to overcome these disadvantages but generally are not completely successful.

Prior art systems sometimes employ automatic gain control by measuring the light reflected from the background of the object to be read and setting the system gain as a function of level of the modulated signal received from the scanned object above the background level. In this type of system the background is frequently close to the detector and normally occupies a substantial portion of the scanning field. Thus, the measurement of the signal to set the gain occurs on a continuous periodic basis and accordingly is easily converted into an AGC signal because, in effect, the AGC signal is derived from a controlled background.

In the inventive system employing a sample label the background is not controlled, and the AGC signal is derived during a very small portion of the scanning field. Hence the AGC signal is not continuous and is received in the form of a few bits of data of the complete scan.

CROSS-REFERENCES TO RELATED APPLICATIONS

Patent application Ser. No. 207,206, titled "Coded Label for Automatic Reading Systems" filed by Frank A. Russo and Ronald P. Knockeart of even date herewith and assigned to The Bendix Corporation, describes circular and square labels which can be used with the invention described herein.

Patent application Ser. No. 207,150, now Pat. No. 3,735,096, titled "System for Processing Coded Pulse Data" filed by Ronald P. Knockeart and Frank A. Russo of even date herewith and assigned to The Bendix Corporation, describes a logic system which can be used with the invention described herein.

Patent application Ser. No. 207,036, now U.S. Pat. No. 3,813,140, titled "Rotating Prism Scanning System Having Range Compensation" filed by Ronald P. Knockeart of even date herewith and assigned to The Bendix Corporation, describes an optical system useful with the inventive system.

SUMMARY OF THE INVENTION

The inventive system is an improvement over the prior art system because it does not select a fixed threshold level which is used to determine the pulse amplitudes of the squarewave output. Instead, the inventive system detects the photomultiplier tube output current as this current varies because of distance and ambient condition changes and as a threshold utilizes a level which is the average between amplitude variations caused by the changes in reflectivity of the reflecting member. In this manner, the maximums and minimums of the PMT output variations occasioned by the reflectivity changes are always centered about the threshold level and, thus, an undistorted squarewave output is realized.

The inventive system is also advantageous over the prior art systems because it contains an automatic gain control feature which automatically changes the gain of the system to compensate for long-term variations, such as variations in the characteristics of a photomultiplying tube, the accumulation of dirt on the optics of the system, and other similar changes which gradually but significantly change the overall characteristics of the system.

The inventive system is also advantageous over prior art systems because it automatically compensates for variations in the range between the scanning mechanism and the scanned label, and also automatically compensates for changes in the contrast of the segments of the label as different colored segments are used for different labels.

FIGS. *2a*, *2b*, and *2c* are waveforms generated by the prior art systems and are useful in explaining the deficiencies of the prior art systems.

Figure 3:
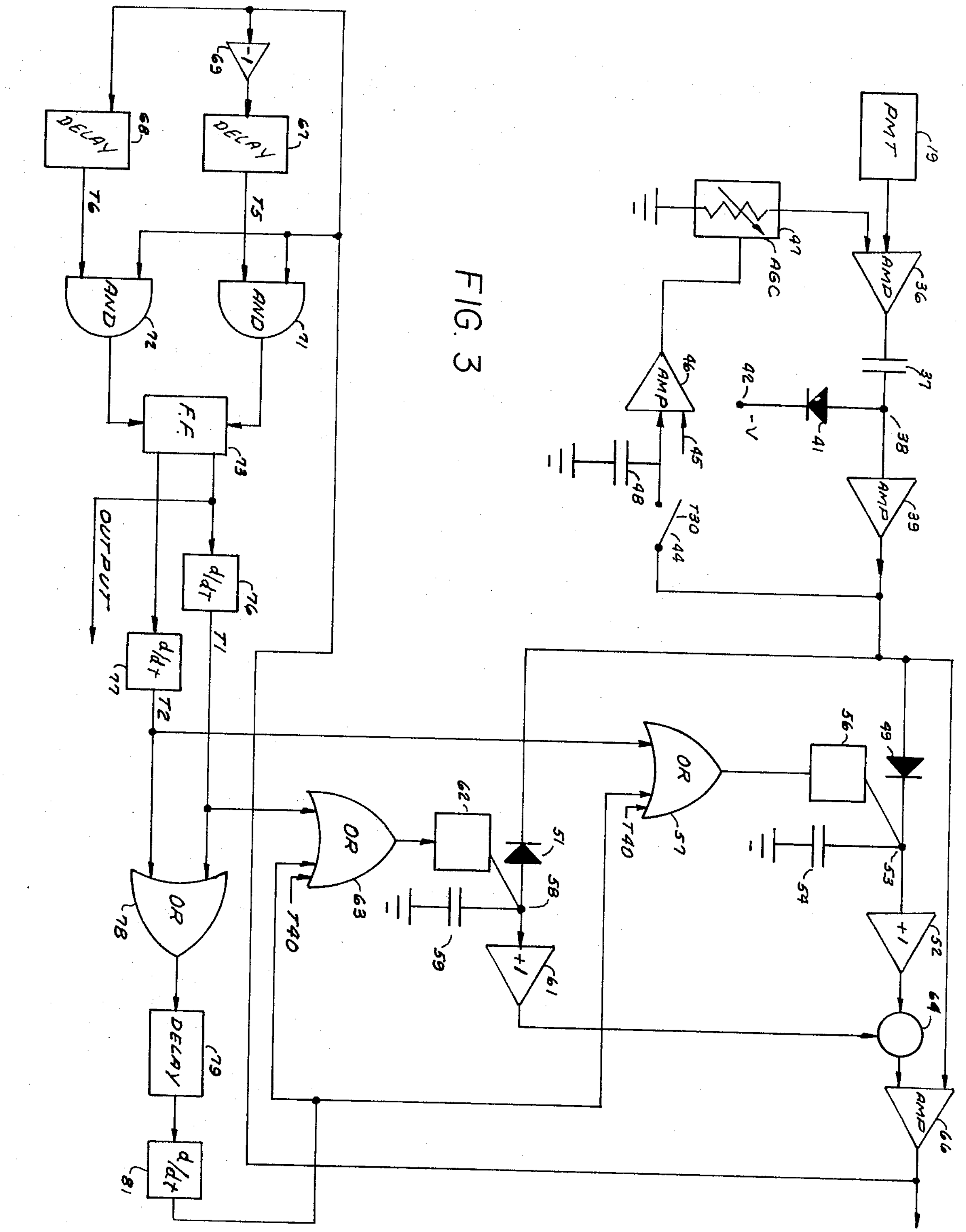

FIG. 3 is a preferred embodiment of the inventive amplifier/detector.

Figure 4:
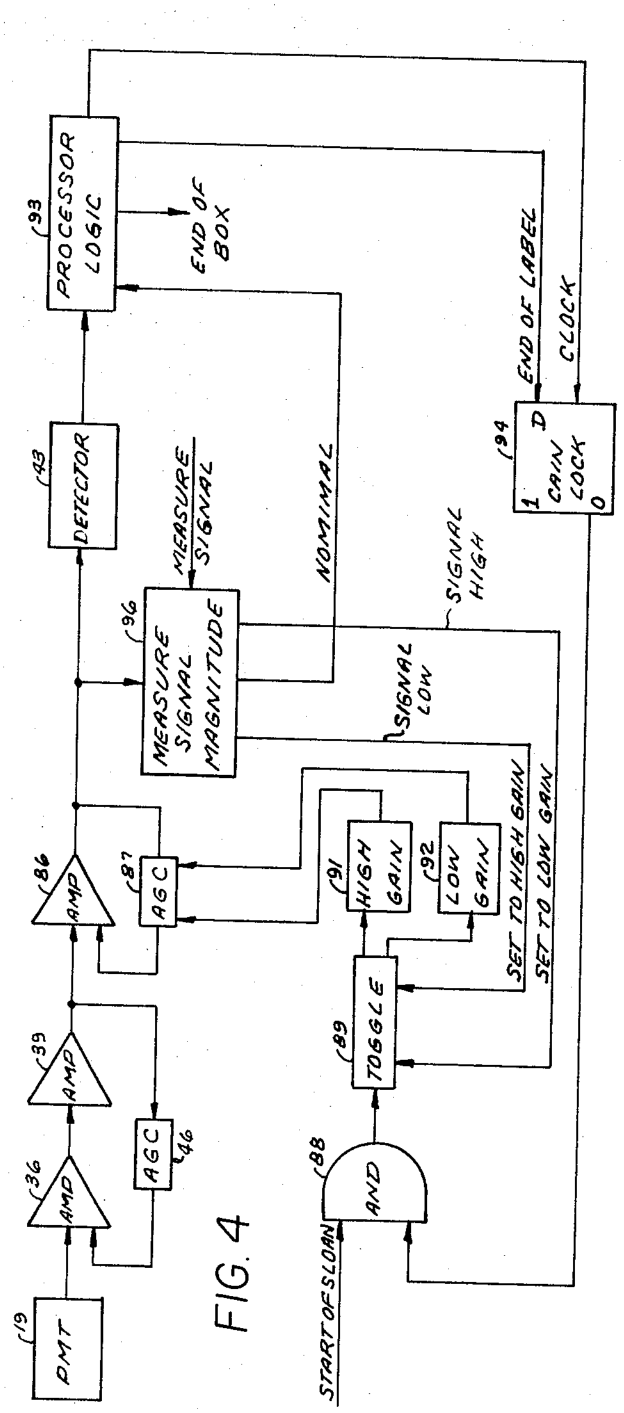

FIG. 4 is a preferred embodiment of a technique for providing automatic gain control to compensate for scanning range and label characteristic variations.

Figure 5:
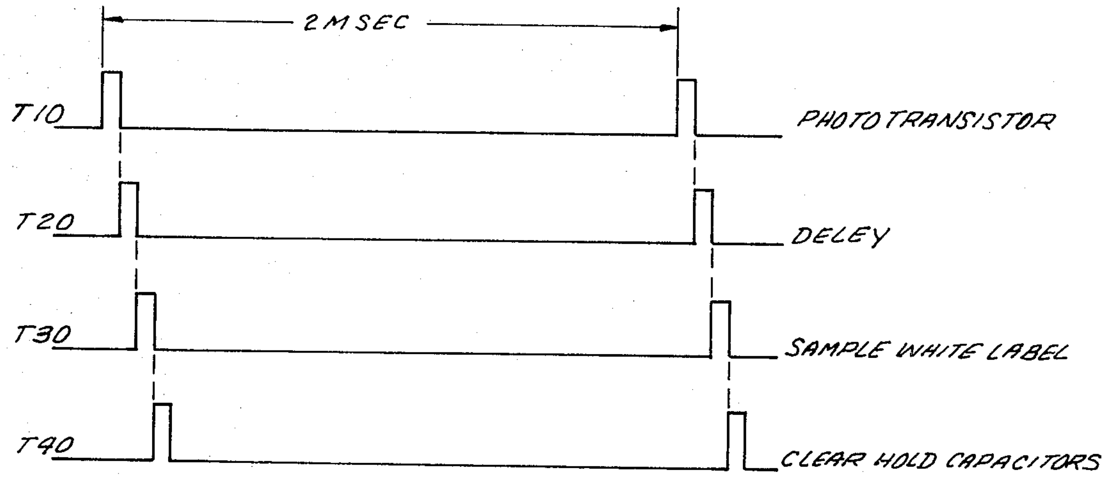

FIG. 5 is a set of timing pulse waveforms useful in understanding the operation of the system.

Figure 6:
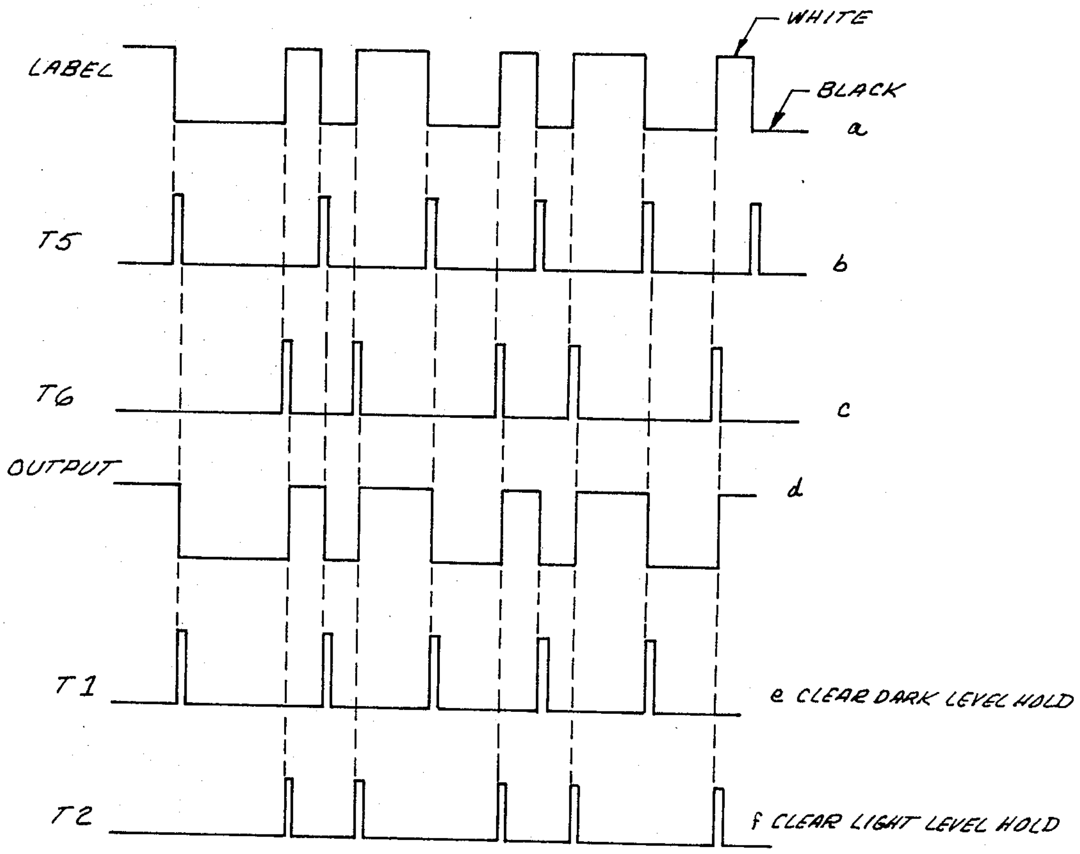

FIG. 6 is a set of waveforms showing the operation of the system when the coded label is being scanned.

Figure 7:
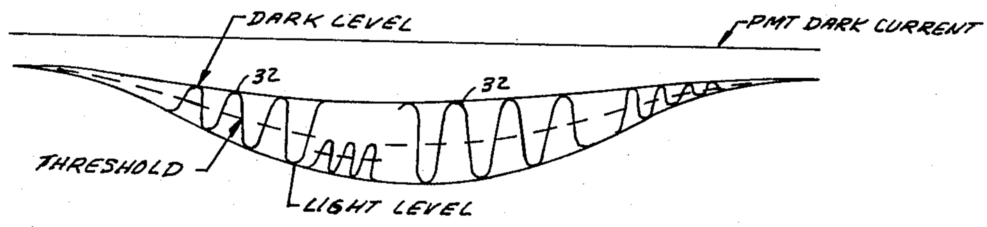
Figure 2A:
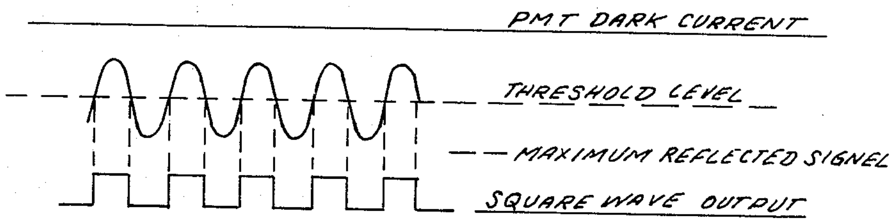
Figure 2B:
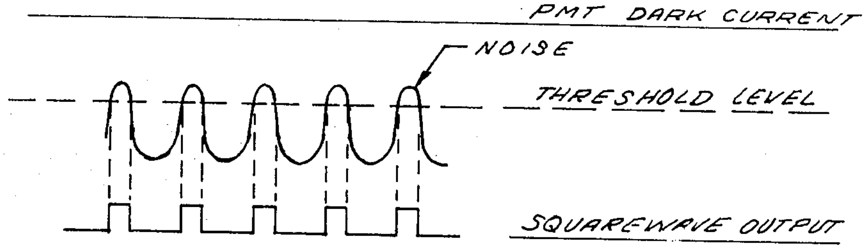
Figure 2C:
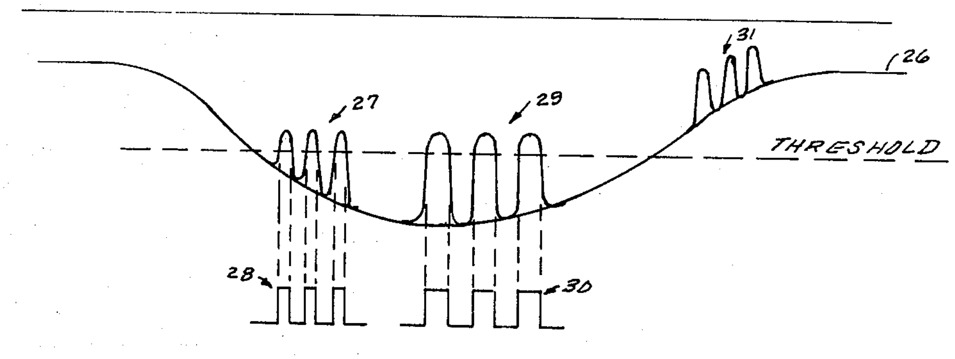

FIG. 7 shows how the threshold level for the inventive system follows the photomultiplier current as it varies with range and other factors.

Figure 8:
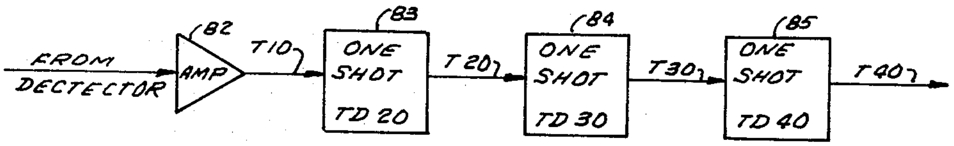

FIG. 8 is a preferred embodiment of a system for generating the timing pulses.

Figure 9:
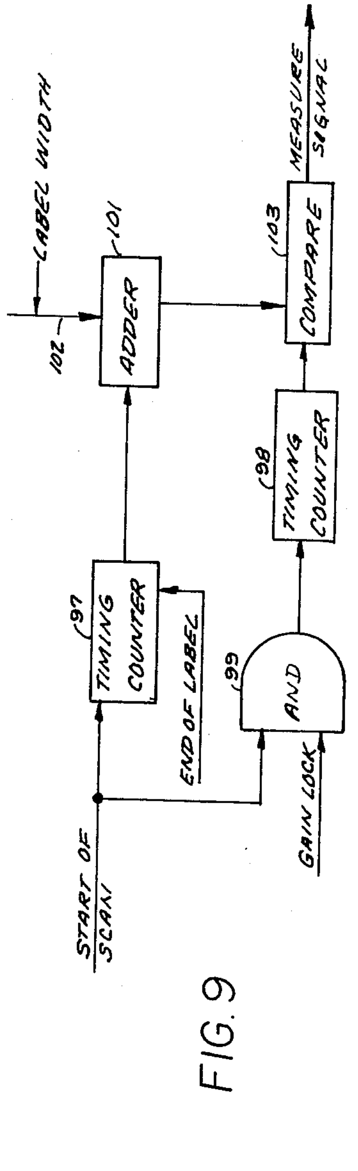

FIG. 9 is a preferred embodiment of a system for generating the measure signal used in the gain control of FIG. 4.

DETAILED DESCRIPTION

A preferred embodiment of the inventive amplifier/detector is illustrated in FIG. 3, and the mode of operation of this embodiment is illustrated in FIG. 7. In FIG. 7, the PMT current is shown to vary in accordance with distance between the scanning mechanism and the scanned label, or because of ambient noise conditions, or for any other number of reasons. In the prior art systems, this variation in PMT current would frequently cause the reflected signals from the label 32 to vary such that the threshold does not fall through the middle of these variations, thereby causing a distorted waveform. However, in the inventive system the threshold is caused to follow the PMT current so that the variation caused by the reflectivity changes of the label are always centered about the threshold level. This is accomplished by detecting the PMT current level and setting the threshold level at a predetermined level above the PMT level.

Figure 1:
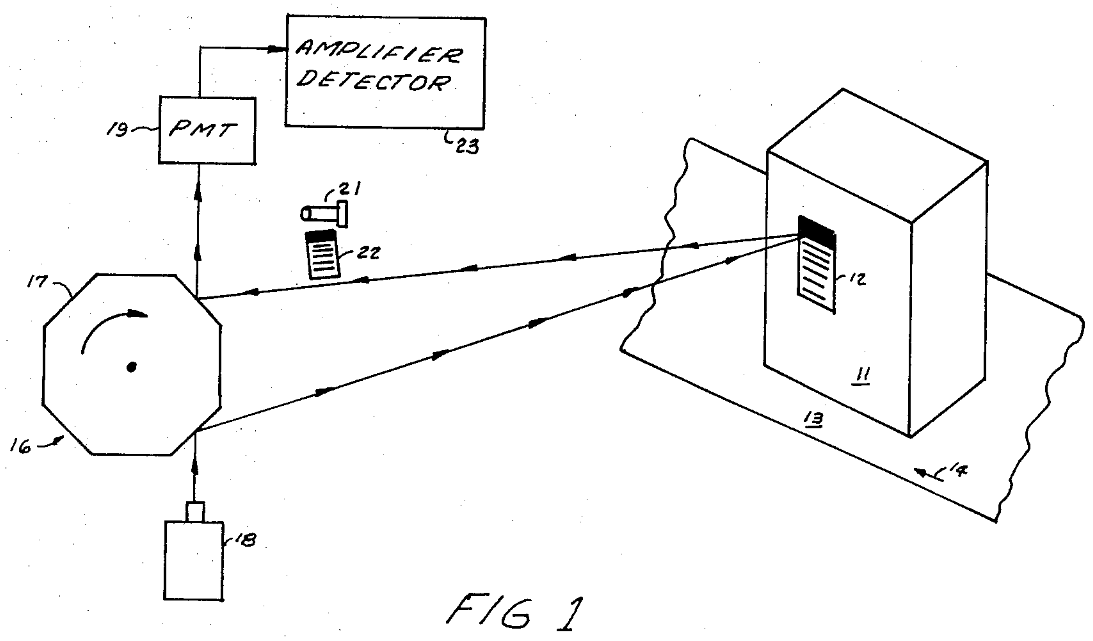
FIG. 1 is a simplified showing of a scanning system in which the inventive system can be employed.

FIG. 3 is a preferred embodiment of the amplifier/detector network which is generally indicated as amplifier/detector 23 in FIG. 1. In FIG. 3 the output of photomultiplying tube 19 is directed to an amplifier 36. Hence, because a label is being scanned, the output of PMT 19 is a varying waveform such as that illustrated in FIG. 7. Hence, the fluctuating voltage levels 32 are amplified by amplifier 36 and applied to a capacitor 37. It should be noted that, because of the operation of the PMT 19, the highest output value is received when no reflected signal is available as an input to PMT 19, and the lowest value is available when a light (or white) segment is being scanned. Hence, the highest voltage to which capacitor 37 is subjected will be that received when a dark segment of a label is being scanned, and the lowest voltage received by capacitor 37 will be the voltage received when a light segment of a label is being scanned.

Capacitor 37 is connected to another amplifier 39 by way of junction 38. Junction 38 is also connected to a clamping diode 41 so that the voltage present at junction 38 cannot exceed the highest voltage determined by the characteristics of diode 41, and the voltage applied to terminal 42. Diode 41 thus serves to clamp junction 38 to a maximum preselected positive voltage. This preselected voltage represents the dark level received from the dark segments of the sample label. Accordingly, the voltage at which junction 38 is maintained can be set in either of two methods. Firstly, a negative voltage can be applied to input terminal 42 with the negative voltage selected to be representative of the darkest environment ever scanned. This would be the interior of the scanning mechanism and would be at some level equal to or slightly less than the level indicated as the PMT dark current level of FIG. 7.

Because junction 38 is clamped to a preselected voltage, the charge on capacitor 37, can never exceed this voltage. However, when highly reflective or light areas are scanned, the voltage falls below the preselected level so that the input to amplifier 39 is a voltage varying in much the manner indicated as pulses 32 in FIG. 7.

The second method of placing a voltage on terminal 42 consists of detecting the low reflective or dark area voltages so that the voltage at junction 38 varies along with the light and dark detected voltages.

The output of amplifier 39 is directed to a detector 43, the operation of which will be described hereinafter. The output of amplifier 39 is also fed back to amplifier 36 through a switch 44, another amplifier 46 and an AGC circuit 47. Switch 44 is used to establish a voltage representative of highly reflective areas on sample label 22 illustrated in FIG. 1. Switch 44 therefore is a schematic representation of a switching circuit which can include either a field effect transistor or a transistor and diode network. Switch 44 therefore is not only an ON-OFF switch, but also has a variable voltage output. In either event, the output voltage of switch 44 is dependent upon the light level voltage coming from the sample label 22 so that capacitor 48 is charged to this level. The input to amplifier 46 is therefore maintained at a level representative of the signal level of the reflected light from the highly reflective segments of the sample label. Switch 44 is actuated by a T30 pulse, the generation of which will be explained hereinafter. However, because of this energization, switch 44 is closed only when the white segment of the sample label is being scanned, so that this segment establishes the lower limit of the input to amplifier 46.

Amplifier 46 receives a reference voltage on input terminal 45. Amplifier 46 is a differential amplifier so that it yields an output proportional to the difference between the two input voltages. The output of amplifier 46 is directed to amplifier 36 through an AGC circuit 47, so that the gain of amplifier 36 is automatically controlled in accordance with the difference between the two inputs to amplifier 46. The output of amplifier 39 is therefore the same level each time switch 44 is actuated. Hence every time the white level of sample label 22 is scanned the output of amplifier 39 is set to a preselected voltage.

AGC circuit 47 can be a field effect transistor, the control electrode of which is coupled to the output of amplifier 46 and which is operated in a potentiometer mode so that its output varies in accordance with the input. It will be appreciated that the input voltage of the AGC loop is dependent upon the reflected signal from the light segment of the sample label 22. Furthermore, as the optical system gets dirty, or the PMT weakens, or other parameters of the system change, the input to amplifier 46 also changes and the gain of amplifier 36 is changed. The system thus automatically compensates for slow, long-term system parameter variations.

The output of amplifier 39 is connected to oppositely poled diodes 49 and 51. Diode 49 is poled so that it passes only the light level voltages and diode 51 is poled to pass only the dark level voltages. The output of diode 49 is directed to an amplifier 52 by way of a junction 53. Coupled between ground and junction 53 is a capacitor 54. Capacitor 54 therefore charges to the highest light level voltage and stores this voltage as an input to amplifier 52. Junction 53 is also coupled to a discharge circuit 56 which is used to discharge capacitor 54 each time the received signal passes from the light level to the dark level. Discharge circuit 56 therefore can contain a transistor having its collector connected to junction 53 and its base and emitter properly biased. The base of the transistor will receive the output of OR gate 57, which is actuated each time the T2 pulses illustrated in FIG. 6*f* are generated at the transistion from the white level to the dark level of the reflected waveform. Details of the waveforms shown in FIGS. 5 and 6 are presented hereinafter.

Capacitor 59, which is coupled to junction 58 of diode 51 and amplifier 61, operates in the same manner as capacitor 54; however, because of the polarity of diode 51, it holds the dark level voltage. This voltage is discharged through a discharge network 62 which would be identical to that of the light hold circuit 56. Capacitor 59 would thus be discharged by the energization of discharge network 63 each time the T1 pulses of FIG. 6*e* are generated because of the transition of the input label waveform from the black level to the light level.

It will now be appreciated that amplifier 52 receives and amplifies the light level voltage while amplifier 61 receives and amplifies the dark level voltage. These two voltages are directed to an averaging circuit 64, the output of which is the average of the light level and dark level voltages. The output of averaging circuit 64 is used as an input to operational amplifier 66. Because the output from averaging of the dark and light level voltages, it represents the midpoint between the dark and white levels of the waveform shown in FIG. 6*a* and serves as the threshold level shown in FIG. 7. In the PMT low reflectivity current is sensed, the waveform will vary as shown in FIG. 7. However, if the low level voltage is clamped as illustrated in FIG. 3, this voltage will be a constant but the threshold will vary because the light level varies.

Amplifier 66 also receives the output of amplifier 39 so that the varying reflected signal from the scanned label (FIG. 6*a*) is also injected into amplifier 66. Hence, each time the signal from amplifier 39 rises above the average level received from averaging circuit 64 a high level output is generated by amplifier 66, and when the signal from amplifier 39 falls below the average voltage level received from averaging circuit 64, a low level output is generated by amplifier 66. Hence, the output of amplifier 66 is the square waveform which is pulse width modulated in accordance with the widths of the reflective segments of the scanned label. The output of averaging circuit 64 is the threshold level illustrated in FIG. 7. Therefore, if the amplitudes change for some reason, such as the scanning of a different label as illustrated by the pulse group 33, the threshold is automatically adjusted to the approximate middle of the reflected signals.

Because the output of amplifier 66 is a squarewave, it could serve as the squarewave output of the system. However, a difficulty can arise because short term noise pulses can cause the reflected signal to trip past the threshold level, resulting in an inaccurate sqaurewave. This is avoided by directing the output of amplifier 66 to two delay circuits 67 and 68. The input to delay 67 is provided through an inverter 69. Delay 67 is actuated by the transitions from the white level to the dark level represented as the T5 signals in FIG. 6*b.* In similar manner, delay 68 is actuated by the transitions of the waveform from the dark to the light level, represented as the T6 signals in FIG. 6*c.* Each of delays 67 and 68 have equal time delays selected to be larger than most noise pulses and shorter than the narrow pulses received from the narrow segments of coded label 12.

The outputs of delays 67 and 68 are respectively directed to AND gates 71 and 72. Both these AND gates also receive the output of amplifier 66. The outputs of AND gates 71 and 72 are respectively coupled to the set and reset inputs of the flip-flop circuit 73. The output of flip-flop 73 is used as the squarewave output of the system.

Delays 67 and 68 in conjunction with AND gates 71 and 72 make the system insensitive to short duration noise pulses. Each negative or positive transition of the output of amplifier 66 actuates either delay 67 or 68. If the transition resulted from a label segment, the change will still be in existence at the end of the delay period, and either AND gate 71 or 72 will be opened and will actuate flip-flop 73. However, if a short term noise pulse caused the transition, the change will have expired before the delay period and neither AND gate 71 nor 72 will be opened. Hence, flip-flop 73 is set and reset only by valid transitions of the output waveforms of amplifier 66 and the output of the system illustrated in FIG. 6*d* is the output of flip-flop 73. The set output of flip-flop 73 actuates differentiating network 76, and the reset output actuates another differentiating network 77. The output pulses of differentiating networks 76 and 77 respectively serve as the T1 and T2 pulses illustrated in FIGS. 6*e* and 6*f*.

The T1 and T2 pulse outputs of differentiators 76 and 77 are respectively directed to OR gates 63 and 67. Accordingly, capaciators 54 and 59 are discharged in synchronism with the transitions of the reflected waveform between the high and low amplitude levels. This prevents the long term storage of the highest level ever received by capacitors 54 and 59. Obviously, because the T1 pulses are generated at the light to dark transitions, and the T2 pulses at the dark to light transitions, capacitors 54 and 59 are not discharged simultaneously but are discharged only along with the appropriate transitions.

The T1 and T2 pulses which respectively are the output of differentiating networks 76 and 77 are directed to an OR gate 78. The output of OR gate 78 actuates a third delay 79. Delay 79 has a period which exceeds the time duration of the widest segment on the label to be scanned by a preselected amount, such as 50 percent. Delay 79 is repeatedly reset by the application of the T1 and the T2 pulses to OR gate 78 and therefore generates no output unless the ouput of amplifier 66 fails to change states within the time period of the delay. When delay 79 does generate an output, it is differentiated in network 81 and applied to OR gates 57 and 63 to discharge capacitors 54 and 59. This is done in order to prevent the system from hanging up on an unusually high signal being received from an unexpectedly high or low reflective element in the vicinity of the label. If such an element were present, either capacitor 54 or capacitor 59 would be charged to a level greatly in excess of the level representative of a reflective segment of the label. Thus, the average of the output voltage of averaging circuir 64 would be drastically changed and substantially change the threshold level of FIG. 7 so that transitions through the threshold would not occur and the output of amplifier 66 would never change conditions. This malfunction is prevented by the presence of delay 79 because, if such a conditions occurs, the output of amplifier 66 does not change conditions during the time period established by delay circuit 79 and an output signal is generated by delay 79. This output is differentiated in differentiating network 81 and applied to OR gates 57 and 63 to effect the discharge of storage capacitors 54 and 59. The system is thus prevented from hanging up on a signal received from an element having a reflectivity differing substantially from the highest and lowest reflectivities of the ordinarily expected scanned target conditions. It should be understood that, if desired, separate delays can be actuated by networks 76 and 87 to separately discharge capacitors 54 and 59.

The timing of the various operations described hereinabove can be best understood by first making reference to FIG. 1. In this figure, photosensitive element 21 receives the laser light before the label 12 on the container 11. The output of photodetector 21 is directed to a photosensitive amplifier 82, shown in FIG. 8, resulting in the generation of a T10 pulse shown in FIG. 5*a*. If desired, detector 21 of FIG. 1 can be used to actuate one-shot 83 of FIG. 8. The fall side of the T10 pulse actuates One-Shot 83, the output of which serves as the T20 pulse shown in FIG. 5*b*. The fall side of the T20 pulse actuates another one-shot 84, the output of which serves as the T30 pulse shown in FIG.. 5*c*. The fall side of the T30 pulse actuates another one-shot 85 to generate the T40 pulse of FIG. 5*d*. Because each set of four pulses, T10, T20, T30, and T40 are generated in less than 2 milliseconds, these pulses occur when sample label 22 is scanned but before coded label 12 is scanned. Accorodingly, these pulses are used to automatically calibrate the system to compensate parameter changes, such as dirty optics, PMT characteristic changes, and circuit element value changes, which inherently take place with age.

Each of the four pulses T10, T20, T30, and T40, has a specific use. The T10 pulse shows that photosensitive detector 21 has been scanned and sample label 22 will be scanned next. The T20 pulse establishes a time delay to insure that the T30 pulse is generated when a white segment of sample label 22 is being scanned.

Reference to FIG. 3 shows that the T30 pulse is used to actuate the voltage sensitive switch 44 to set the gain of the system in accordance with the reflection from a white label segment. If it is desired to detect the dark level and apply it to input terminal 42 instead of using the preselected level, the T20 pulse will be used to accomplish this function if sample label 22 has a dark segment first. If sample label 22 has a white segment first, it may be necessary to add a one-shot to FIG. 8 in order to detect the dark level. These changes are within the purview of those skilled in the art. Reference too FIG. 3*a* further shows that the T40 pulses is applied to OR gates 57 and 63 to effect the discharge of capacitors 54 and 59 before the scanning of the coded label 12 commences.

Referring to FIG. 1, it should be understood that a complete scan of container 11 occurs for each facet 17 of prism 16. Hence, a scan angle of about 90° is scribed by each facet. Less than 60° of this scan angle is used to scan container 11, and therefore the other 30° is available for other surfaces. The scanning of sample label 22 and the resulting generation of timing pulses T10, T20, T30, and T40 therefore takes place in the "extra" 30°, and takes place for each facet 17 of prism 16.

The description to this point is directed to a system which (1) is capable of generating an undistorted squarewave form even though the ambient conditions vary substantially, (2) includes automatic gain control to automatically compensate for long term system parameter changes, and (3) is insensitive to long term and short term ambient noise conditions which ordinarily would degradate the squarewave output or cause the system to hang up. However, the system as thus far described does not include any means for compensating for changes in the reflected signal level which occur with scanning range changes or a means for compensation for the change in the reflectivity ratio which takes place when the segment color combination on the coded label is changed. FIG. 4 is a preferred embodiment of a system for achieving these last two desirable characteristics.

It should be noted that FIG. 4 is an addition to FIG. 3, rather than a replacement thereof. This is evidenced by showing amplifiers 36, 39, and automatic gain control circuit 46 and its associated circuitry such as AGC 47 and switch 44 in both FIGS. 3 and 4. Furthermore, detector 43 is also shown in both figures. Hence, the FIG.4 adds amplifier 86 and the associated circuitry described hereinafter. Amplifier 86 is added in order to change the gain of the system in accordance with distance changes between the scanning mechanism and the scanned label and also as a mechanism for compensating for different reflectivity ratios of the segments on the scanned label. This is accomplished by the control of AGC circuit 87 which controls the gain of amplifier 86 in accordance with the received signal. AGC circuit 87 is controlled by use of an AND gate 88, which receives a start of scan signal. This signal is the signal which indicates the start of scanning of container 11 and thus should not be confused with the T10 pulse generated by photodector 21. The generation of the start of scan pulse is fully described in U.S. Pat. No. 3,813,140 referenced hereinabove. The signal is present until an end of box signal is generated by logic processor 93.

AND gate 88 is coupled to a toggle, or flip-flop, 89 which has two outputs. One output actuates high gain network 91 and the other actuates low gain network 92. The outputs of the two gain networks 91 and 92 control AGC circuit 87 and thus control the gain of amplifier 86. It should be noted that, as illustrated here, only two gain conditions are shown — a high gain and a low gain. However, it is within the purview of those skilled in the art to either apply several incremental control inputs to AGC circuit 87 or to provide a proportional control input to AGC circuit 87 so that the gain of amplifier 86 is more closely controlled.

The output of detector 43 is directed to a logic processing circuit 93. This is a processing circuit which decodes the waveform received from the detector 43 and which identifies the contents of the container carrying the coded label. This circuit is described in detail in U.S. Pat. No. 3,735,096, fully identified hereinabove. When a valid label has been scanned one time, logic processor 93 generates an end of label signal which is applied to the set input of the gain lock flip-flop 94. A clock signal is available from processor 93 to the clock input of gain lock flip-flop 94. The output of flip-flop 94 is coupled to the other input of AND gate 88.

In operation, when the system is first energized, processor 93 applies a clock input to gain lock flip-flop 94 so that a 1 input is available to one input terminal of AND gate 88. Accordingly, when the start of scan signal is received by AND gate 88, it generates an output which toggles flip-flop 89 to either the high gain or the low gain condition and AGC circuit 87 sets the gain of amplifier 86 in accordance with the gain control input. Assume first, that high gain circuit 91 is actuated by toggle 89. Amplifier 86 is then set to a high gain condition.

The output of amplifier 86 is directed to detector 88 which converts the analog signal received from the label to a squarewave and provides the squarewave, to processor logic 93, which then serves to decode the squarewave form. At the end of the first scan, and assuming it was a valid scan, the end of label signal is generated by logic processor 93 so that gain lock flip-flop 94 is set, thereby removing the 1 input from AND gate 88 and deactuating this circuit. Toggle 89 therefore remains in the high gain output condition so that the gain of AGC circuit 87 remains constant. If the scan was not valid, no end of label signal is generated and toggle 89 is toggled and amplifier 86 is set to the low gain condition for the next scan.

Assuming that, at the application of the start of scan signal to AMD gate 88 toggle 89 is set to the low gain condition AGC circuit 87 to maintain amplifier 86 in the low gain condition. If the low gain condition of amplifier 86 permitted detector 43 to properly detect the signal, an end of label signal is generated by logic processor 93 and flip-flop 94 is set to deactuate AND 88 and maintain amplifier 86 in the low gain condition. However, if at the end of the first scan processor logic circuit 93 could not read the code, an end of label signal is not generated and gain lock flip-flop 94 remains in the reset condition and the application of a 1 input to AND gate 88 continues. Toggle flip-flop 89 is thus toggled to the high gain condition to increase the gain of amplifier 86 so that detector 43 receives higher amplitude signals. Detector 43 then processes the higher amplitude signals into an improved squarewave and presents the squarewave to logic circuit 93, which then is more likely to be able to read the code and generate an end of label signal to set flip-flop 94 and inhibit AND gate 88.

From the above description of the operation, it is evident that the system responds to deviations in the amplitude of the reflected signal to change the gain of the amplifier, and thus the system automatically compensates for increases or decreases in range occuring between the scanning mechanism and the scanned label.

It is apparent from the above description that there are conditions in which the system properly reads the label in a marginal low gain condition. In such cases it may or may not be possible to read the label on the next scan, depending upon the ambient noise condition. This condition could occur at a scanning range resulting in decrease of the reflected signal to a low level. This condition also could occur when the color combination of the label segments is changed so that the contrast in reflectivity of the segments is decreased from the optimum contrast obtained from a black and white label. Compensation for this is provided by use of measure signal circuit 96 which generates high and low gain set outputs to change the condition of toggle 89 and thus changes the gain of amplifier 86 through AGC circuit 87. Measure signal magnitude circuit 96 is actuated by a measure signal which is generated in a manner described with respect to FIG. 9. It should be appreciated that the purpose of the measuring the magnitude of the signal by use of circuit 96 is to verify that the amplitude of the signal which is received from the scanned label falls within a predetermined range. This circuit therefore compares the received signal with a reference signal and generates a signal which indicates that the received signal is either of a nominal value, a low value, or a high value. The generation of the reference signal is within the purview of one skilled in the art. The measure signal injected into signal magnitude measuring circuit 96 is used to make certain that the measurement takes place during the scanning of the coded label. This is explained with respect to FIG. 9.

FIG. 9 includes two timing counters 97 and 98 with counter 97 receiving the start of scan signal directly and counter 98 receiving the start of scan signal through an AND gate 99. AND gate 99 also receives the output signal from gain lock flip-flop 94 of FIG.4, while timing circuit 97 also receives the end of label signal generated by processor logic 93 of FIG. 4. Because timing counter 97 receives a start of scan signal, it starts counting at the instant this signal is received and continues to count until it is shut off by the end of label signal generated by processor logic 93. The output count from counter 97 is received by an adder 101. However, because the total count of counter 97 includes the sample label and any other scanning which occurs between the sample label and the coded label, it is necessary to make certain that the count falls within the coded label. This is done by injecting a label width count into adder 101 by way of input lead 102. Adder 101 actually is a subtractor and thus subtracts these two counts so that the output count is a count which falls within the scan of the coded label.

The events explained to this point occur during the first scan of the label, and therefore counter 98 remains empty because AND 99 has not been turned open. If the first label scan was valid, an end of label signal is generated and gain lock flip-flop 94 generates an output. Hence, during the second scan of the label AND gate 99 is actuated and timing counter 98 counts the pulses received during the second scan. The pulses from counter 98 and adder 101 are applied to a compare circuit 103 which generates the measure signal when compared counts are received to insure that the coded label is being scanned. The comparison signal is applied to measure signal magnitude circuit 96 of FIG. 4, resulting in the measurement of the amplitude of the received signal ocurring at that instant.

When measure signal magnitude circuit 96 measures the received signal and finds that the amplitude is of a nominal level it supplies a nominal signal to processor logic 93, and the system continues operation as normal. However, if the amplitude of the measured signal is found to be low, measure signal magnitude circuit 96 generates a low level output which is used to set toggle 89 to the high gain condition, thereby increasing the gain of amplifier 86. In similar manner, if the measured amplitude is found to be high, a high level output is generated by measure signal magnitude circuit 96 to set toggle 89 to the low gain condition, thereby decreasing the gain of amplifier 86 and bringing the output thereof to within the nominal value.

What is claimed is:

1. A system for converting an analog signal which varies between a high amplitude and a low amplitude into a squarewave comprising:

first means for detecting and storing one of said amplitudes;

second means for detecting and storing the other of said amplitudes;

means for averaging the outputs of said first and second means for detecting and generating an average signal representative of the average of said high and low amplitudes;

means for receiving said average signal and said analog signal and generating a squarewave output, said squarewave having a high level when said analog signal rises above said average signal and a low level when said analog signal rises above said average signal and a low level when said analog signal falls below said average signal;

first and second discharge means for respectively discharging said first and second means for detecting at preselected time periods;

and first delay means responsive to the transitions of said squarewave from said high level to said low level and second delay means responsive to the transitions of said squarewave from said low level to said high level, said delays each establishing said preselected time period and said first and second delay means respectively actuating said first and second discharge means to discharge said means for detecting and storing at the end of said preselected time period so that said system is immune to short term noise transitions.

2. The system of claim 1 further including a third delay means responsive to said first and second delay means, said third delay means having a preset time delay which exceeds the longest time period between consecutive transitions of said squarewave, said third delay means actuating said first and second discharge means at the end of said preset time delay to render said system immune to long time analog signals exceeding said high and low amplitudes.

3. The system of claim 2 further including logic processor means responsive to said detector means and generating a waveform termination signal when a valid squarewave is received from said detector means;

said gain control means including gain level set means responsive to said waveform termination signal and setting the gain level of said gain control means.

4. The system of claim 3 wherein said level control means includes means for generating gain level signals to control the gain of said amplifier; and bistable circuit means responsive to said waveform termination signal for controlling said means for generating gain level signals.

5. The system of claim 4 further including means for measuring said amplitudes and generating low level, high level and nominal level signals as said amplitudes vary about reference level amplitudes;

said level control means receiving said level signals and controlling the gain of said amplifier in accordance with said level signals.

6. The system of claim 5 wherein said means for measuring said amplitudes includes means for generating a measure signal to insure that said high, low and nominal level signals are generated within a preselected time of said squarewave.

7. The system of claim 6 wherein said means for generating a measure signal includes:

first counter means for counting during the first time period said waveform is generated;

count adder means receiving the output of said first counter means and a reference count to generate a compared count;

second counter means for counting during the second time period said waveform is generated;

comparison means for receiving the count from said second counter means and said compared count and generating said measure signal when said second counter count and said compared count are equal.

8. A system for converting an analog signal which varies between a high amplitude and a low amplitude into a squarewave comprising:

first means for detecting and storing one of said amplitudes;

second means for detecting and storing the other of said amplitudes;

means for averaging the outputs of said first and second means for detecting said means for averaging generating an average signal representative of the average of said high and low amplitudes;

comparison means for receiving said average signal and said analog signal and generating a squarewave output, said squarewave having a high level when said analog signal rises above said average signal and a low level when said analog signal falls below said average signal;

means for amplifying said analog signal and providing the amplified signal to said means for detecting, said means for amplifying including means for clamping the output of said means for amplifying to a predetermined value representative of one of said analog amplitudes.

9. The system of claim 8 further including automatic gain control means responsive to the other of said analog amplitudes for controlling the gain of said amplifier in accordance with a sample of said other amplitude.

10. The system of claim 8 further including first and second discharge means for respectively discharging said first and second means for detecting at preselected time periods.

11. The system of claim 10 further including first delay means responsive to the transitions of said squarewave from said high level to said low level and second delay means responsive to the transitions of said squarewave from said low level to said high level, said delays each establishing said preselected time period and said first and second delay means respectively actuating said first and second discharge means to discharge said means for detecting and storing at the end of said preselected time period so that said system is immune to short term noise transitions.

12. The system of claim 11 further including logic processor means responsive to said detector means and generating a waveform termination signal when a valid squarewave is received from said detector means;

said gain control means including gain level set means responsive to said waveform termination signal and setting the gain level of said gain control means.

13. The system of claim 12 wherein said level control means includes means for generating gain level signals to control the gain of said amplifier; and bistable circuit means responsive to said waveform termination signal for controlling said means for generating gain level signals.

14. The system of claim 13 further including means for measuring said amplitudes and generating low level, high level and nominal level signals as said amplitudes vary about reference level amplitudes;

said level control means receiving said level signals and controlling the gain of said amplifier in accordance with said level signals.

15. The system of claim 14 wherein said means for measuring said amplitudes includes means for generating a measure signal to insure that said high, low and nominal level signals are generated within a preselected time of said squarewave.

16. The system of claim 15 wherein said means for generating a measure signal includes:

first counter means for counting during the first time period said waveform is generated;

count adder means receiving the output of said first counter means and a reference count to generate a compared count;

second counter means for counting during the second time period said waveform is generated;

comparison means for receiving the count from said second counter means and said compared count and generating said measure signal when said second counter count and said compared count are equal.

* * * * *

UNITED STATES PATENT OFFICE
CERTIFICATE OF CORRECTION

Patent No. 3,860,794 Dated January 14, 1975

Inventor(s) Ronald P. Knockeart and John R. Wilkinson

It is certified that error appears in the above-identified patent and that said Letters Patent are hereby corrected as shown below:

IN THE SPECIFICATION

IN THE ABSTRACT

Line 6, the word "reflectives" should read ---reflectivities---;

Line 9, the word "reflectives" should read ---reflectivities---.

Column 1, line 4, add after "1971" ---now abandoned---;

Column 1, line 52, change "exit" to read ---exist---;

Column 4, line 4, the word "variation" should read ---variations---;

Column 6, line 8, after the word "averaging" add ---circuit 64 is the average---;

Column 6, line 39, change "sqaure-" to read "square-"---;

Column 7, line 12, change the number "67" to read ---57---;

Column 7, line 24 change "put" to read ---puts---;

Column 7, line 43 change "circuir" to read ---circuit---;

Column 7, line 48, change "conditions" to read ---condition---;

Column 8, line 13, change "Accorodingly" to read ---Accordingly---;

Column 8, line 14, after the word "compensate" add the words ---for system---

UNITED STATES PATENT OFFICE
CERTIFICATE OF CORRECTION

Patent No. 3,860,794 Dated January 14, 1975

Inventor(s) Ronald P. Knockeart and John R. Wilkinson

It is certified that error appears in the above-identified patent and that said Letters Patent are hereby corrected as shown below:

IN THE SPECIFICATION CONTINUED

Column 8, line 35, change "pulses" to read ---pulse---;

Column 8, line 61, change "tion" to read ---ing---;

Column 9, line 18, change "photodector" to read ---photodetector---;

Column 10, line 6, change "AMD" to read ---AND---.

IN THE CLAIMS

Claim 1

Column 11, lines 62 and 63, delete after the word signal in line 62

---rises above said aver-age signal and a low level when said analog signal---.

Signed and sealed this 6th day of May 1975.

(SEAL)
Attest:

RUTH C. MASON
Attesting Officer

C. MARSHALL DANN
Commissioner of Patents
and Trademarks

USCOMM-DC 60376-P69
★ U.S. GOVERNMENT PRINTING OFFICE : 1969 O—366-334